July 1, 1924.
H. C. SIMMONS
DENTAL TRAY
Filed July 19, 1922
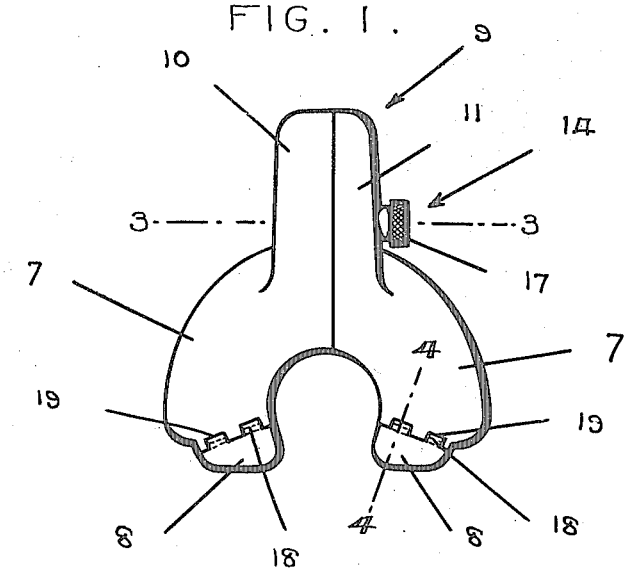
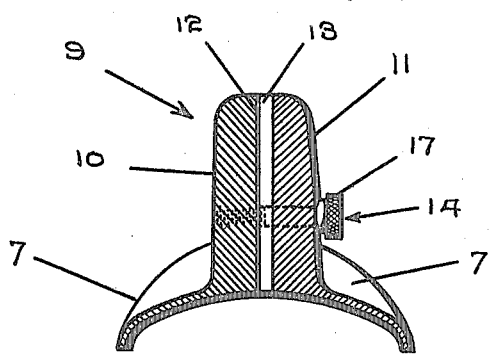
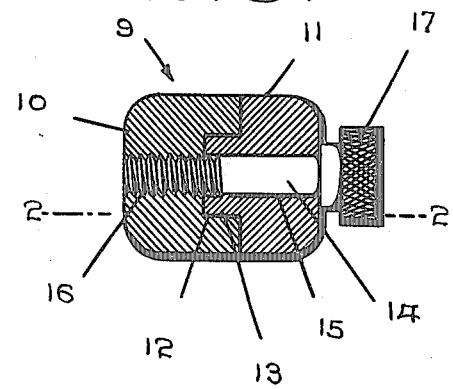
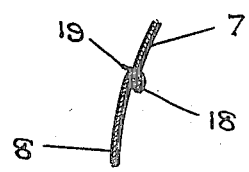
Inventor:
H. C. SIMMONS,
By W. J. FitzGerald
Attorney.

Patented July 1, 1924.

1,499,482

UNITED STATES PATENT OFFICE.

HENRY CHARLES SIMMONS, OF ATLANTA, GEORGIA.

DENTAL TRAY.

Application filed July 19, 1922. Serial No. 575,967.

*To all whom it may concern:*

Be it known that I, HENRY C. SIMMONS, a citizen of the United States, residing at Atlanta, in the county of Fulton and State of Georgia, have invented certain new and useful Improvements in Dental Trays; and I do hereby declare the following to be a full, clear, and exact description of the invention, such as will enable others skilled in the art to which it appertains to make and use the same.

The present invention relates to dental trays used for the making of impressions and molds of the jaws and teeth, and aims to provide a novel and improved device of that character.

Another object of the invention is to provide a dental tray having a handle, and the tray and handle being divided so as to be separable for removing the wax or other material containing the impression in halves, and the handles being fitted and secured together in a novel manner.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawing, wherein—

Figure 1 is a perspective view of the improved dental tray.

Fig. 2 is a section thereof longitudinally of the handle, the line 2—2 of Fig. 3 indicating the plane of section of the handle.

Fig. 3 is an enlarged cross section of the handle taken on the line 3—3 of Fig. 1.

Fig. 4 is a sectional detail on the line 4—4 of Fig. 1 showing the detachable hinge joint of the corresponding wing.

The tray proper is split or divided between its ends into the halves or sections 7, and wings 8 are hinged to the inner lip of the tray at the ends of the tray, so as to be movable for pressing the wax or other material over the area of the jaws where there are no muscle attachments covering the jaw bone, the tray illustrated being for the lower jaw bone and set of teeth.

The tray has a handle 9 extending upwardly at an angle from the intermediate portion thereof, for manipulating the tray, and said handle is split or divided in the median plane of the tray, to provide the sections 10 and 11 integral with the corresponding halves or sections of the tray at the adjacent ends of said tray sections. Said handle sections 10 and 11 are adapted to fit together snugly, for holding the tray sections together, and in order to prevent lateral displacement of the handle sections and tray sections, the side of the handle section 10 adjacent to the handle section 11 has a longitudinal groove 12 and the confronting side of the handle section 11 has a longitudinal tongue 13 to fit snugly in said groove. The tongue fitting in the groove will prevent transverse or edgewise displacement of the handle and tray sections, but will permit the sections to be separated sidewise or longitudinally relatively to one another when the handle sections are detached.

A screw 14 is used for clamping the handle sections together, and said screw extends transversely through the handle sections, the handle section 11 having an aperture 15 through which the screw can be slid, and the handle section 10 having a threaded aperture 16 into which the screw is threaded. The knurled head 17 of the screw enables the screw to be conveniently rotated, and said head bears against the handle section 11 for clamping the handle sections tightly together. When the screw is tightened, the handle sections are secured together from end to end, and the tray sections are held in proper relation for making the impression in the well known manner.

After the impression has been made in the wax or other material in the tray, the screw 14 is removed, thereby permitting the handle and tray sections to be separated, which enables the wax or similar impression to be removed from the mouth in halves. When the halves of the impression have thus been removed, the sections of the tray and handle can again be fitted together and secured by the screw 14, thereby bringing the halves or sections of the impression together the same as when in the mouth. The making of the impression of the lower jaw and teeth is thus facilitated, with a saving of time and trouble, and providing for greater uniformity.

As shown in Fig. 4, each wing 8 is detachably connected to the tray. Thus, the wing 8 has the hooks 18 to engage inwardly through slots 19 provided in the inner lip of the tray, thereby not only detachably connecting the wing with the tray but also hingedly mounting the wing. The wing can thus be swung for pressing the wax or other material into place, and the wing can then be detached or removed from the tray, the hooks 18 passing easily out of the slots 19.

Having thus described the invention, what is claimed as new is:—

1. A dental tray having a handle, said tray and handle being divided, the handle sections having a tongue and groove at their adjacent sides extending longitudinally of the handle to fit together, and means for clamping the handle sections together.

2. A dental tray having a slot therein near one edge, and a wing to extend beyond said edge having a hook to be inserted through said slot for hinging the wing to said tray, said hook being adapted to be withdrawn from said slot to detach the wing from the tray.

In testimony whereof I have signed my name to this specification in the presence of two subscribing witnesses.

HENRY CHARLES SIMMONS.

Witnesses:
  F. PENDLEY,
  J. E. DODSON.